US012084329B2

(12) United States Patent
Latvala et al.

(10) Patent No.: US 12,084,329 B2
(45) Date of Patent: Sep. 10, 2024

(54) POWERED MACHINE ACCESSORIES AND ASSOCIATED METHODS

(71) Applicant: Muvalift, LLC, Spokane, WA (US)

(72) Inventors: Matthew Vincent Latvala, Spokane, WA (US); Bonnie Adele Latvala, Spokane, WA (US)

(73) Assignee: Muvalift, LLC, Spokane, WA (US)

( * ) Notice: Subject to any disclaimer, the term of this patent is extended or adjusted under 35 U.S.C. 154(b) by 27 days.

(21) Appl. No.: 17/859,936

(22) Filed: Jul. 7, 2022

(65) Prior Publication Data

US 2023/0074742 A1 Mar. 9, 2023

Related U.S. Application Data

(60) Provisional application No. 63/318,721, filed on Mar. 10, 2022, provisional application No. 63/260,966, filed on Sep. 8, 2021.

(51) Int. Cl.
*B66F 9/12* (2006.01)
*B66F 9/075* (2006.01)

(52) U.S. Cl.
CPC ............ *B66F 9/12* (2013.01); *B66F 9/07504* (2013.01)

(58) Field of Classification Search
USPC ............................................................ 414/11
See application file for complete search history.

(56) References Cited

U.S. PATENT DOCUMENTS 3,909,056 A * 9/1975 Duwe .................. B65G 49/067 414/11
4,247,243 A 1/1981 Carter
4,329,103 A * 5/1982 Miller ........................ B66F 9/12 414/24.5
4,560,318 A * 12/1985 Rodgers .................. E02F 3/962 172/253
4,692,089 A * 9/1987 Rodgers .................. E02F 3/962 172/253
4,756,661 A 7/1988 Smart
5,082,413 A * 1/1992 Grosz .................. A01D 87/126 294/119.1
5,127,791 A * 7/1992 Attman ..................... B66F 9/10 52/745.11
5,564,885 A 10/1996 Staben, Jr.

(Continued)

OTHER PUBLICATIONS

WO PCT/US2022/037347 Search Rept., Oct. 13, 2022, Muvalift LLC.
WO PCT/US2022/037347 Writt. Opin., Oct. 13, 2022, Muvalift LLC.

(Continued)

*Primary Examiner* — Mark C Hageman
(74) *Attorney, Agent, or Firm* — Randall Danskin P.S.

(57) ABSTRACT

Powered machine accessories and associated methods are described. According to one aspect, a powered machine accessory includes an attachment apparatus configured to attach the powered machine accessory to a powered lift apparatus of a powered machine, and a support apparatus coupled with the attachment apparatus, and wherein the support apparatus is configurable into a plurality of different configurations at a plurality of different moments in time to retain a plurality of different articles upon the support apparatus at the different moments in time while the different articles are moved by the powered lift apparatus of the powered machine.

26 Claims, 12 Drawing Sheets

(56) References Cited

U.S. PATENT DOCUMENTS

| | | | | |
|---|---|---|---|---|
| 5,624,222 | A * | 4/1997 | Hiatt | B66F 9/18 414/607 |
| 6,394,737 | B1 | 5/2002 | Griffin | |
| 6,405,460 | B1 | 6/2002 | Whitmire et al. | |
| 6,848,883 | B2 * | 2/2005 | Atencio | A01D 87/0076 414/24.5 |
| 6,881,023 | B1 | 4/2005 | Sullivan | |
| 6,988,866 | B2 * | 1/2006 | Friedland | B66F 9/12 37/405 |
| 6,990,758 | B1 | 1/2006 | Holmes et al. | |
| 8,641,357 | B2 * | 2/2014 | Johnson | E02F 3/962 37/405 |
| 10,538,895 | B2 * | 1/2020 | Heath | E02F 3/962 |
| 10,556,783 | B2 * | 2/2020 | Ivey | B66F 9/19 |
| 11,186,963 | B2 * | 11/2021 | Clearman | E02F 3/40 |
| 2011/0078930 | A1 | 4/2011 | Dunn | |
| 2020/0283990 | A1 | 9/2020 | Clearman | |

OTHER PUBLICATIONS

Amazon, "Mountainpeak Excavator Quick Attach Bucket Ear Mount Fit for Kubota U35 KX71 KX91 KX121 KX040 KX033", available online at https://www.amazon.com/Mountainpeak-Excavator-Attach-Bucket-Kubota/dp/B095C4MGRC, Jun. 13, 2022, 6 pages.

Amazon, "Titan Attachments 46-in Skid Steer Pallet Fork Frame Attachment, Rate 4,000 LB, Quick Tach Tractor", available online at https://www.amazon.com/Pallet-Forks-Attachment-Tractors-Loaders/dp/B00PJCB84Q?th=1, May 11, 2022, 9 pages.

Latvala et al., U.S. Appl. No. 63/260,966, filed Sep. 8, 2021, titled "Multi Use Bucket Accessory", 10 pages.

Latvala et al., U.S. Appl. No. 63/318,521, filed Mar. 10, 2022, titled "Configurable Equipment Accessory", 21 pages.

Latvala et al., U.S. Appl. No. 63/318,721, filed Mar. 10, 2022, titled "Configurable Equipment Accessory", 25 pages.

Notification Concerning Transmittal of International Preliminary Report on Patentability, PCT/US2022/037347, dated Mar. 21, 2024

* cited by examiner

POWERED MACHINE ACCESSORIES AND ASSOCIATED METHODS

RELATED PATENT DATA

This application claims the benefit of U.S. Provisional Patent Application Ser. No. 63/260,966, filed Sep. 8, 2021, entitled "Multi Use Bucket Accessory," and U.S. Provisional Patent Application Ser. No. 63/318,721, filed Mar. 10, 2022, entitled "Configurable Equipment Accessory," the disclosures of which are incorporated herein by reference.

TECHNICAL FIELD

This disclosure relates to powered machine accessories and associated methods.

BACKGROUND OF THE DISCLOSURE

Excavators and similar construction and agricultural type equipment are generally used for Earthmoving functions. Attachments for such equipment are also typically intended for Earthmoving, such as to pierce the ground and/or relocate dirt or debris. Conventional equipment and attachments have relatively limited uses based upon the specific designs of the equipment or attachments. In addition, the attachments for conventional earthmoving equipment are typically made of heavy materials for strength and durability, and accordingly are relatively cumbersome to attach and remove from the equipment.

Many construction sites, ranches, farms, foresters, trail builders, other industries and homeowners have a backhoe, excavator or other equipment with some type of attachment (such as bucket or rake) available for their use. However, as mentioned above, conventional equipment and attachments therefor are typically purpose-built and limited to specific functions (e.g., moving dirt or debris) and are typically not adaptable for a variety of alternative uses.

At least some aspects of the disclosure are directed to accessories for powered machines, such as tractors, excavators, back hoes, etc. As discussed below, some embodiments of the powered machine accessories disclosed herein expand the capabilities of the associated powered machines beyond their typical uses of moving Earth material.

BRIEF DESCRIPTION OF THE DRAWINGS

Example embodiments of the disclosure are described below with reference to the following accompanying drawings.

DETAILED DESCRIPTION OF THE DISCLOSURE

This disclosure is submitted in furtherance of the constitutional purposes of the U.S. Patent Laws "to promote the progress of science and useful arts" (Article 1, Section 8).

Aspects and embodiments of the present invention discussed herein include accessories that are configured for use with an associated powered machine, such as an excavator, tractor, or backhoe. Typically, the powered machines have a powered arm or arms and a work implement that is configured for a specific use, such as a bucket for moving Earth or other material. Some embodiments of accessories discussed herein expand the capabilities, applications of use and utility of the associated powered machines compared use with conventional work implements. For example, the powered machine accessory may be configured to support and retain one or more articles on the powered machine accessory while a powered arm of the associated powered machine moves the articles from one position to another. Example articles that may be supported and retained by powered machine accessories described herein include without limitation building materials (e.g., plywood, windows, doors, drywall, metal roofing, flooring, beams, posts, logs), household materials (e.g., storage containers, garbage containers, mattresses, refrigerators, furnishings, boxes of goods), and agricultural materials (e.g., fencing, tank sprayers, hay bales). The powered machine accessory may be configured differently at different times to support and retain articles of different types, shapes, sizes and/or configurations upon a lift apparatus of a powered machine as discussed with respect to illustrative example embodiments below.

Figure 1:
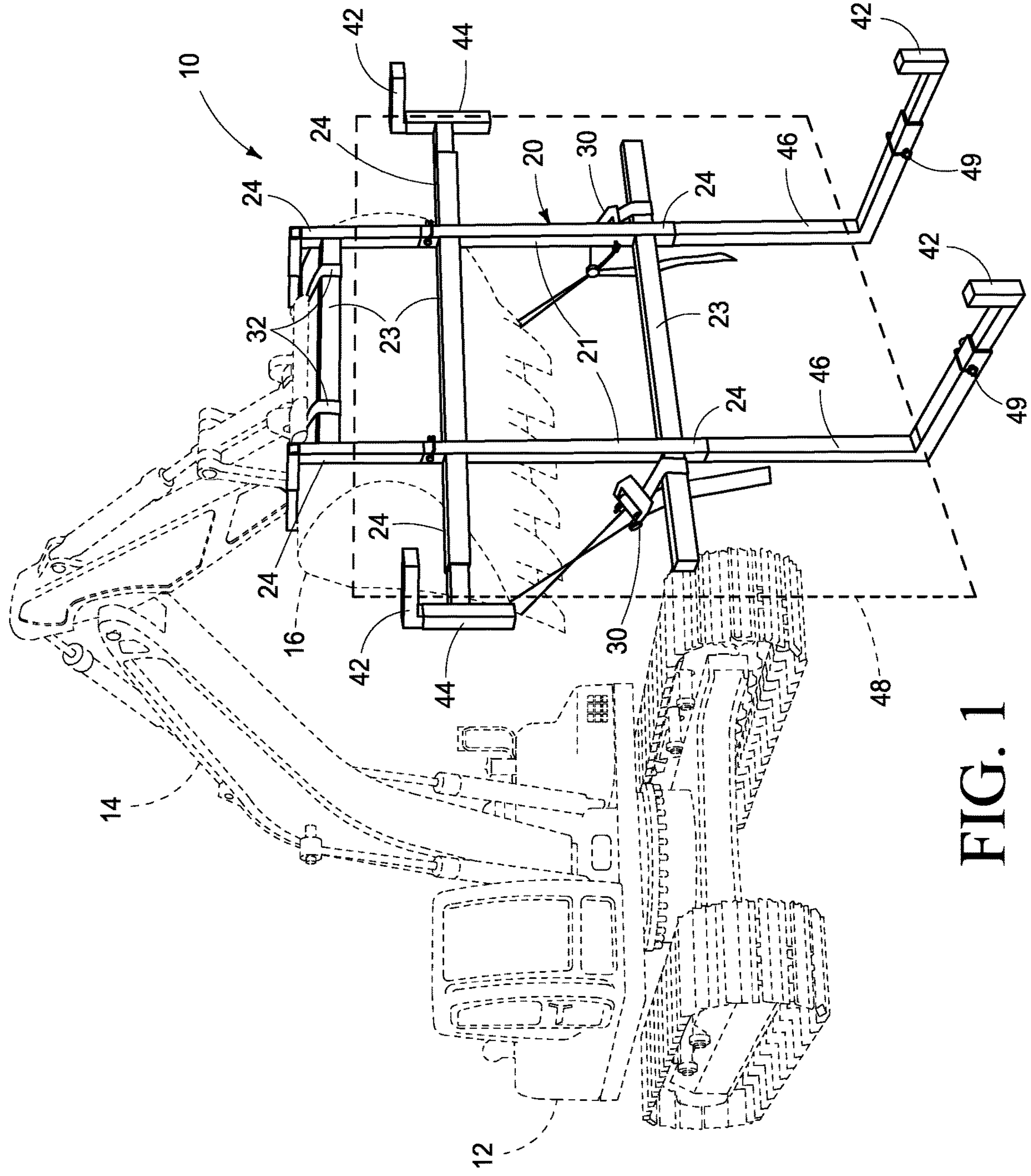
FIG. 1 is a perspective view of one embodiment of a powered machine accessory attached to a back of a bucket of an excavator.

Referring to FIG. 1, a powered machine accessory 10 that is configured for use with a powered machine 12 in the form of an excavator is shown according to one embodiment. The powered machine 12 includes a powered lift apparatus 14 in the form of a powered (e.g., hydraulic) arm in FIG. 1 and a work implement 16 in the form of a bucket at a distal end of the powered lift apparatus 14. The powered machine accessory 10 is shown attached to a back of the bucket of powered machine 12 in the illustrated embodiment.

Figure 2:
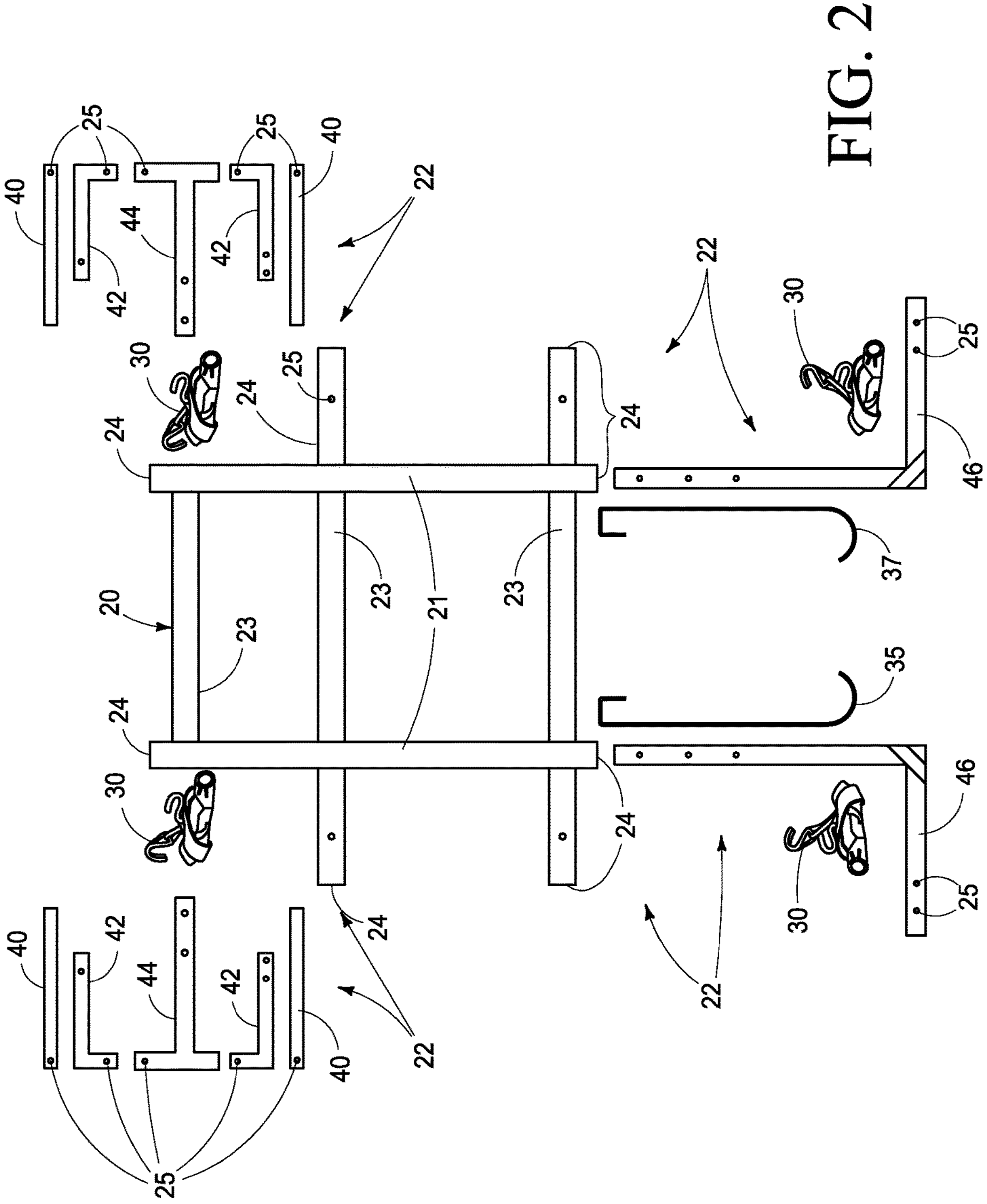
FIG. 2 is an exploded view of component parts of one embodiment of a powered machine accessory.

Referring to FIG. 2, a plurality of components of one embodiment of the powered machine accessory 10 are shown. The illustrated powered machine accessory 10 includes a base frame 20 and a plurality of attachment members 22.

Base frame 20 includes left and right vertical members 21 and top, middle, bottom horizontal members 23 in the illustrated embodiment. The base frame 20 additionally has a plurality of attachment points 24 at a plurality of different locations about a periphery of the base frame 20 and the attachment members 22 are configured to be removably attached to the different attachment points 24 to configure the accessory 10 differently for attachment to different arrangements of the powered machine 12 or work implements 16 thereof as well as retaining and moving different types, sizes and configurations of articles as discussed further below. The attachment points 24 are provided at tops and bottoms of vertical members 21 and the sides of the middle and bottom horizontal members 23 of base frame 20 in the depicted arrangement. In one embodiment, the attachment points 24 are hollow and configured to receive attachment members 22 that are inserted therein. The attachment members 22 may be rotated and inserted into the attachment points 24 at different angular relationships with respect to the attachment points 24 to provide accessories 10 having different configurations at different moments in time.

Some of the attachment members 22 are configured as attachment implements that are configured to removably attach or secure the powered machine accessory to different points of attachment of a powered lift apparatus 14 of powered machine 12 or an associated work implement 16 of powered machine 12 at different moments in time. In the example of FIG. 2, the attachment implements include a plurality of straps 30 and mount brackets 32. The straps 30 may include ratchets for secure attachment of the powered machine accessories to the powered machines or work implements thereof.

The base frame 20, straps 30 and mount brackets 32 are one embodiment of an attachment apparatus that is configurable into a plurality of different configurations at different moments in time, for example, by attaching different attachment implements to different attachment points 24 or other portions of base frame 20. The different configurations of the attachment apparatus are used to attach the powered machine accessory 10 to different powered lift apparatuses 14 (or different work implements 16 thereof) of powered machine 12 as described in some example embodiments herein. The example configurations of attachment apparatuses discussed herein fixedly attach the respective accessories 10 to the powered machine 12, lift apparatus 14 or work implement 16 such that the accessories 10 do not move relative to the machine 12, lift apparatus 14 or work implement 16 once the accessories 10 are attached by the attachment apparatus.

Other attachment members 22 include retaining implements including extensions 40, small L-posts 42, T-posts 44, and large L-posts 46 in the embodiment shown in FIG. 2. The retaining implements are configured to be removably coupled with different attachment points 24 of base frame 20 to support and retain at least one article upon the accessory 10 and powered machine 12 as the article(s) are moved by the machine 12. The base frame 20, extensions 40, small L-posts 42, T-posts 44, and large L-posts 46 are referred to as a support apparatus that is configurable into a plurality of different configurations at different moments in time, for example, by attaching different retaining implements to different attachment points 24 of base frame 20. The different configurations of the support apparatus are used to support and retain different types, sizes and configurations of articles upon the support apparatus and powered machine accessory 10 while the articles are moved by the powered machine 12 at different moments in time as described according to some of the example embodiments herein.

Figure 4:
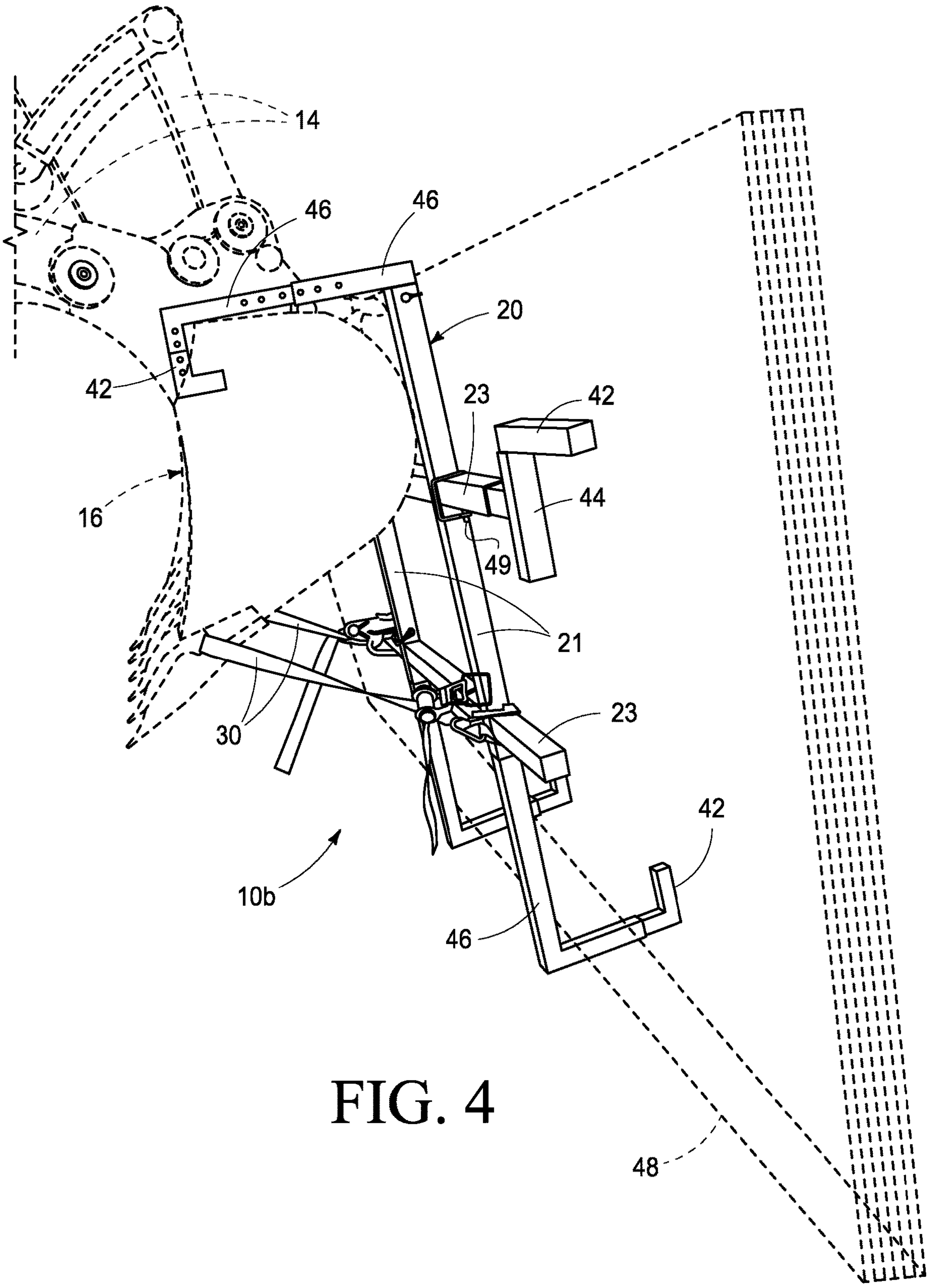
FIG. 4 is a perspective view of one embodiment of a powered machine accessory attached to a back of a bucket of an excavator.
Figure 8:
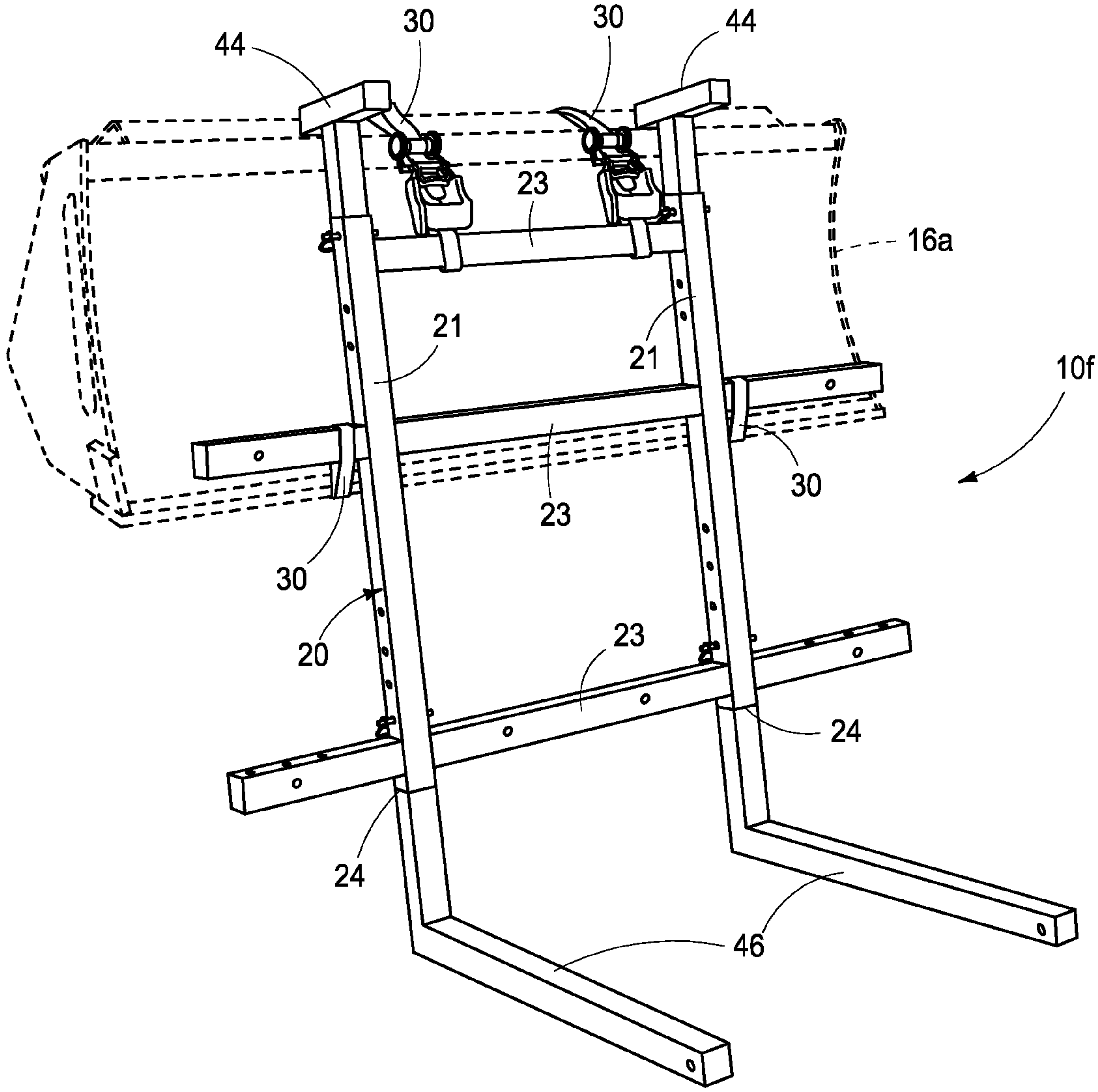
FIG. 8 is a perspective view of one embodiment of a powered machine accessory attached to a front of a bucket of a tractor.

Some of the retaining implements (e.g., extensions 40, L-posts 42, 46 and T-posts 44) may also be utilized to attach the powered machine accessory to a powered machine, for example as shown in FIGS. 4 and 8 and discussed below, and may be referred to as attachment implements.

In one embodiment, the base frame 20 and attachment members 22 are fabricated from square stock steel. The attachment members 22 may have square tubing of different dimensions that permit insertion of attachment members 22 into attachment points 24 of base frame 20 as well as into other attachment members 22 to form the different configurations of the attachment apparatuses and support apparatuses discussed herein.

The tubing of the base frame 20 and attachment members 22 may include a plurality of holes 25 as shown in FIG. 2 to receive connection pins or other structures to removably secure the attachment members 22 to desired attachment points 24 of base frame 20 and/or other attachment members 22 to provide the different configurations of the attachment apparatuses and the support apparatuses described herein. The example attachment members 22 shown in FIG. 2 have different structural configurations to provide different configurations of the attachment apparatuses and support apparatuses of the accessory 10 once the attachment members 22 are attached to the desired attachment points 24.

In addition, the attachment members 22 may be attached at different angular relationships relative to the base frame 20 to provide the different configurations of the attachment and support apparatuses. For example, small L-post 42 and T-post 44 are orthogonal to a plane of the base frame 20 in the embodiment of FIG. 3 and the small L-post 42 and T-posts 44 are within or parallel to the plane of the base frame in the embodiment of FIG. 4.

Powered machine accessories 10 described herein have various configurations of attachment apparatuses and support apparatuses to attach to various powered machines, or work implements thereof, and support various articles of different sizes, types and configurations. Illustrative configurations of powered machine accessories 10 including different attachment apparatuses and support apparatuses are described below according to example embodiments. Other configurations of powered machine accessories 10 are possible for attachment to different powered machines and work implements and to support and retain additional articles or articles in different orientations relative to accessory. In some additional examples of different configurations of accessory 10, different attachment or retaining implements may be attached to different attachment points 24 of base frame 20 to attach to different work implements 16 or powered machines 12 and different retaining implements may be attached to different attachment points of base frame 20 to support, retain and secure different articles.

As mentioned above, various examples of attachment apparatuses and support apparatuses of different embodiments of the powered machine accessory 10 are shown and described herein. The securing straps 30 and mounting brackets 32 may be affixed to different parts of the powered machine accessory 10 (around retaining implements, base frame, etc. as shown in some of the embodiments below) as well as to different parts or points of attachment of the powered machine or work implements thereof (as additionally shown in example embodiments below). In general, the straps 30 and/or mounting brackets 32 are connected to the powered machine 12 and accessory 10 in a manner to prevent or minimize movements of the powered machine accessory 10 relative to the powered machine 10 during operation and moving of articles. Other apparatus or attachment methods may be used to secure the accessories 10 to powered machines 12 in other embodiments.

Referring again to FIG. 1, the illustrated embodiment of the powered machine accessory 10 is configured to support and retain one or more article(s) 48, such as building materials including plywood, windows, doors, etc., in a vertical orientation. The support apparatus of the illustrated configuration of the powered machine accessory 10 includes T-posts 44 attached to upper side left and right attachment points 24 of base frame 20 and small L-posts 42 attached to the T-posts 44. The depicted support apparatus further includes large L-posts 46 attached to the bottom attachment points 24 of base frame 20 and small L-posts 42 attached to large L-posts 46.

The attachment apparatus of the illustrated configuration of the powered machine accessory 10 of FIG. 1 includes two lower straps 30 and two mount brackets 32 to secure the accessory to different points of attachment of the work implement 16 in the illustrated embodiment. Each of the straps 30 are attached to the lower horizontal member 23 of base frame 20 and points of attachment at the bottom of work implement 16. Mount brackets 32 are attached to the top horizontal member 23 of base frame 20 and points of attachment at the top work implement 16 (additional details of the attachment of the mount brackets 32 to the work implement 16 are shown in one example in FIG. 7).

During use, the lower smaller L-posts 42 and large L-posts 46 operate as retaining implements of bottom retainers that support the article(s) 48 from locations below the article(s) 48 to enable the powered machine to lift and move the article(s) 48. The side T-posts 44 and small L-posts 42 operate as retaining implements of side retainers that contact opposite sides of the article(s) 48 to minimize lateral movement of article(s) 48 and retain the article(s) 48 in positions over the L-posts 46 during movement of the article(s) 48 by the powered machine 12. The base frame 20 operates as a back retainer to support back portions of the articles 48 to prevent reward movement of the article(s) 48 with respect to the accessory 10 during movement of the article(s) 48 by the work implement 16 and accessory 10.

Two example connection pins 49 are shown in FIG. 1 securing the lower small L-posts 42 to the large L-posts 46. Although not shown in FIG. 1, additional pins 49 and holes 20 may be provided to secure the other attachment members 22 to the base frame 20 or to other attachment members 22 during use. All holes 25 and pins 49 may not be shown in the drawings of the embodiments of the power accessory disclosed herein although it is to be understood that such connections may be used to removably connect attachment members to one another and/or to the base frame 20.

Figure 3:
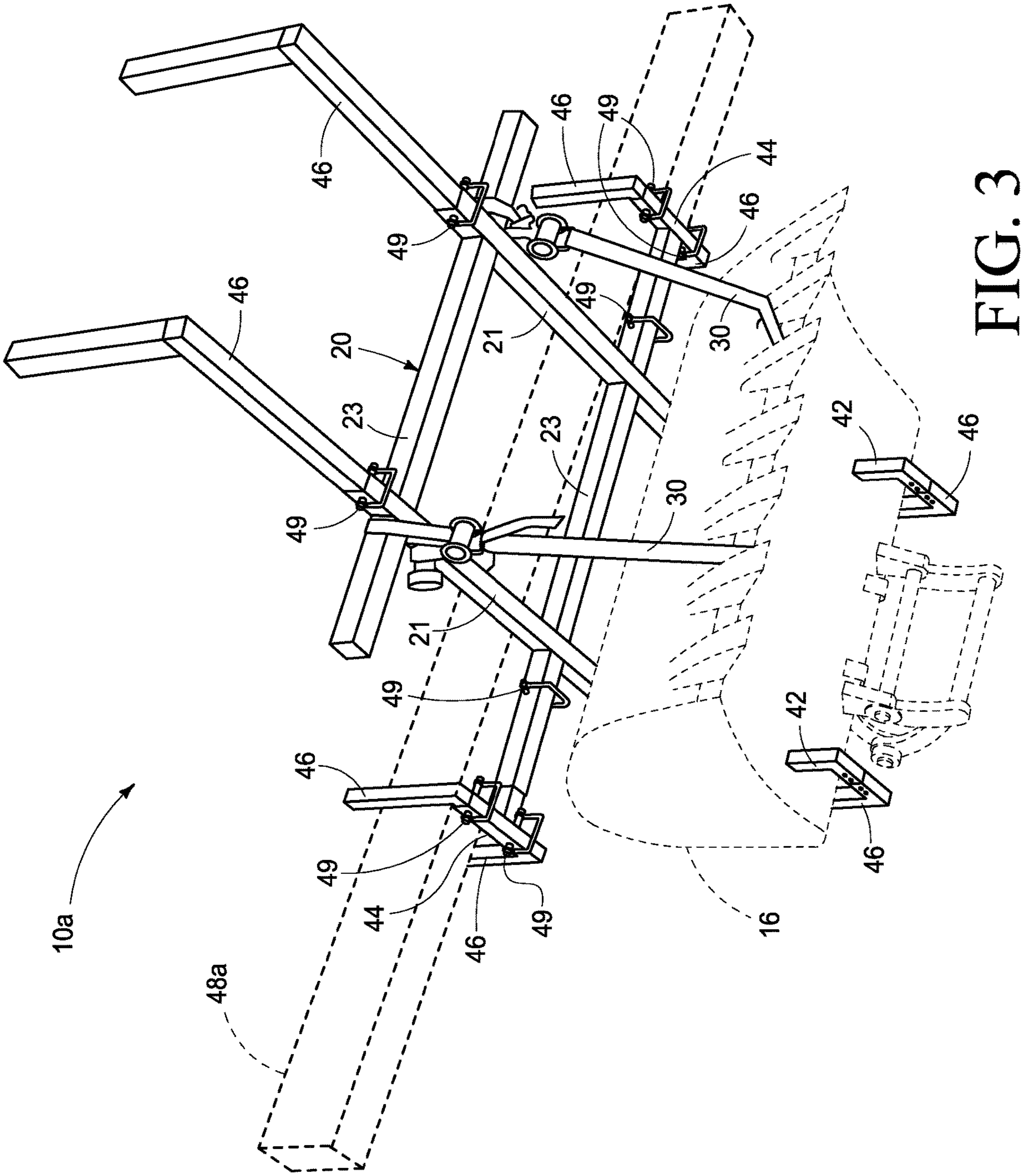
FIG. 3 is a perspective view of one embodiment of a powered machine accessory attached to a back of a bucket of an excavator or backhoe.

Referring to FIG. 3, the illustrated embodiment of the powered machine accessory 10*a* is configured to support and retain one or more relatively long article(s) 48*a*, such as building materials including posts or beams, in a horizontal-orientation with respect to the ground. The support apparatus of the illustrated powered machine accessory 10*a* includes left and right bottom retainers, each including a T-post 44 and two L-posts 46 connected to the T-post 44 that is further connected to the middle horizontal member 23 of the base frame 20. Large L-posts 46 are shown attached to base frame 20 and may be used to support additional building material articles, or alternatively, the large L-posts 46 may be omitted.

The attachment apparatus of the illustrated configuration of the powered machine accessory 10*a* includes two straps 30 that are attached to the bottom horizontal member 23 and points of attachment at the bottom of the work implement 16. In addition, the illustrated attachment apparatus includes two large L-posts 46 and two small L-posts 42 that are attached to points of attachment at the top of the work implement 16 and upper attachment points of the base frame 20 (additional details of example attachment of the accessory 10*a* to the work implement 16 are shown in FIG. 4)

During use, the base frame 20 and T-posts 44 and L-posts 46 coupled therewith operate as retaining implements of bottom retainers to support the article 48*a* from below as well as front and back retainers to minimize forward and rearward movement of the article 48*a* and retain the article 48*a* on the accessory 10*a* during movement of the article 48*a* by the powered machine 12 and work implement 16.

As shown in the examples of FIGS. 1 and 3 and further below, the example support apparatuses may be used to support and retain a plurality of articles of different sizes, types and configurations upon the support apparatus as the articles are supported and moved by the powered machine 10.

Referring to FIG. 4, the illustrated embodiment of the powered machine accessory 10*b* is configured to support and retain one or more relatively wide article(s) 48, such as plywood, windows, doors, etc. in a horizontal orientation.

The support apparatus of the illustrated configuration of the powered machine accessory 10*b* includes T-posts 44 attached to upper side left and right attachment points 24 of base frame 20 and small L-posts 42 attached to the T-posts 44. The depicted support apparatus further includes large L-posts 46 attached to the bottom attachment points 24 of base frame 20 and small L-posts 42 attached to large L-posts 46.

The attachment apparatus of the illustrated configuration of the powered machine accessory 10*b* includes two straps 30 that are attached to the bottom horizontal member 23 and points of attachment at the bottom of the work implement 16. The depicted attachment apparatus also includes two large L-shaped members 46 and one small L-shaped member 42 that attach to points of attachment at upper portions of the work implement 16.

During use, the bottom large L-posts 46 and small L-posts 42 coupled therewith operate as retaining implements of bottom retainers to support the articles 48 from below. The T-posts 44 and small L-posts 42 coupled therewith operate as retaining implements of back retainers to support back portions of the articles 48 and prevent reward movement of the articles 48 with respect to the accessory 10*b* during movement of the articles 48 by the work implement 16 and accessory 10*b*.

Figure 5:
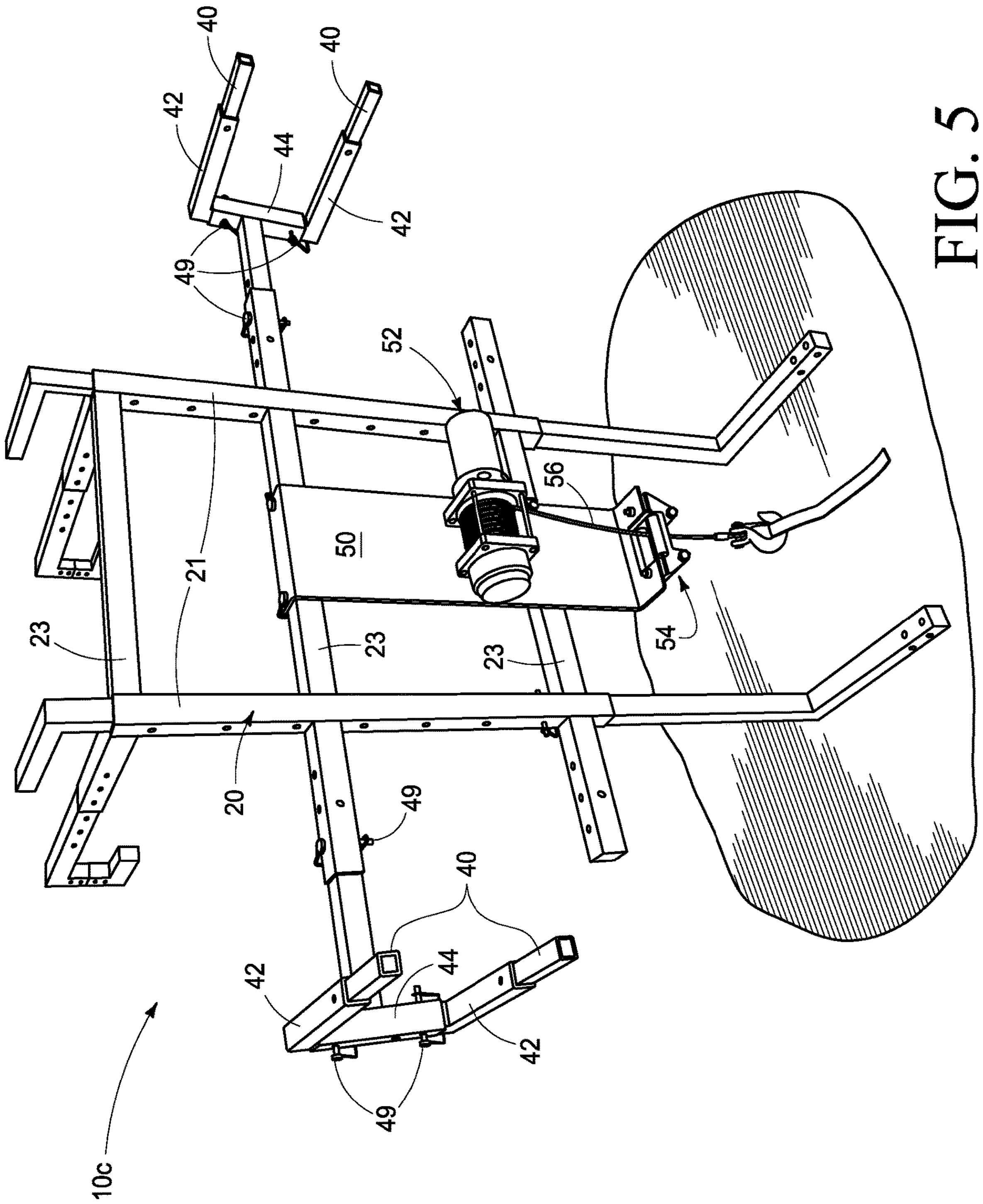
FIG. 5 is a perspective view of a powered machine accessory having a winch mounted thereon according to one embodiment.

Referring to FIG. 5, the illustrated embodiment of the powered machine accessory 10*c* includes a winch support 50 that is configured to retain a winch 52 thereon for attachment to a powered lift apparatus 14 of a powered machine 12 via the accessory 10*c*. The support plate 50 may be removably attached to the middle and bottom horizontal members 23 of the base frame 20 of accessory 10*c* and winch 52 is configured to draw a cable 56 through a cable guide 54 also mounted to winch support 50 during operation. The winch 52 may be configured to receive operational power from a battery mounted on support plate 50, via a connection to the powered machine 12 or other source (the battery and connections are not shown in FIG. 5).

During use, the accessory 10*c* may be attached to a powered lift apparatus of a powered machine (or work implement thereof) and the winch 52 may be moved to a desired position by the power lift apparatus to assist a user. The powered machine accessory 10*c* may be attached to powered lift apparatuses 14 or implements 12 thereof using attachment apparatuses and attachment implements shown and described herein with respect to the embodiments of FIGS. 1, 3, 4, and 6-10. The illustrated accessory 10*c* also includes side retainers each including a T-posts 44, two L-posts 42 and two extensions 40 to operate as retaining implements to support and retain articles being moved by the accessory 10*c* and the powered machine 12.

Figure 6:
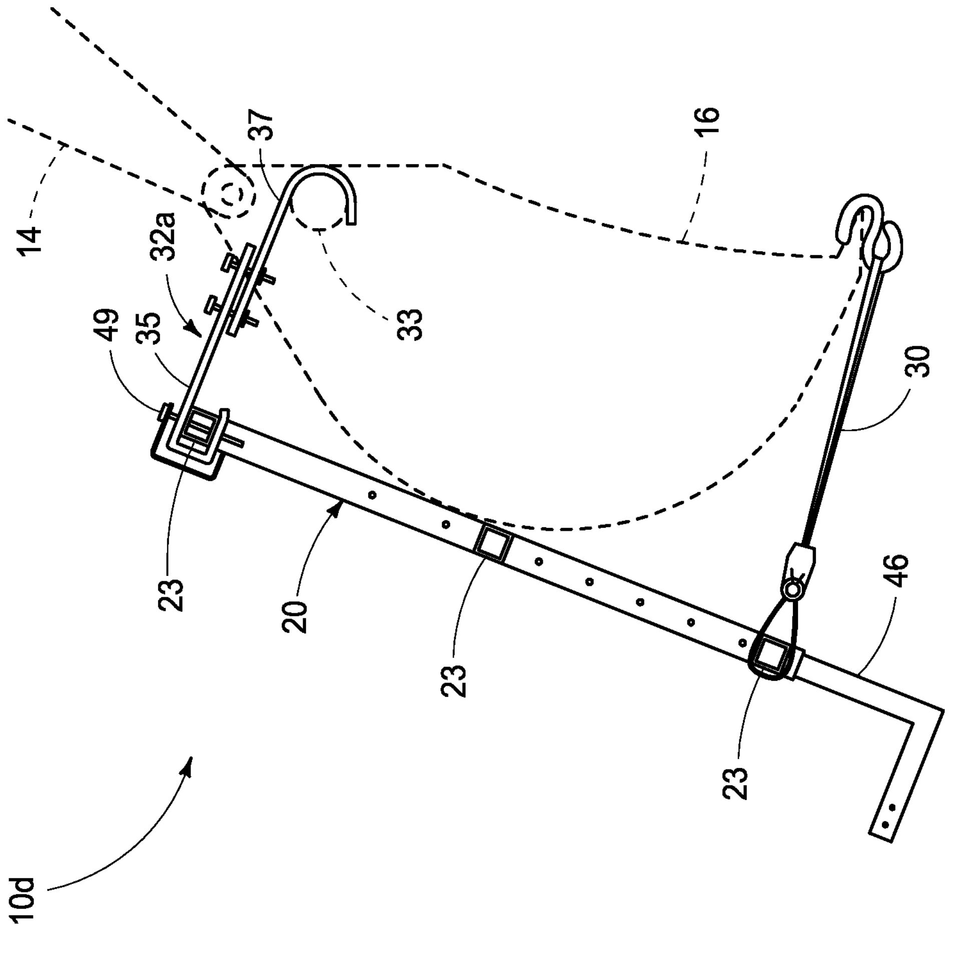
FIG. 6 is a side view of one embodiment of a powered machine accessory attached to a back of a bucket of an excavator.

Referring to FIG. 6, a side view of a powered machine accessory 10*d* is shown according to one embodiment. The depicted accessory 10*d* is configured to be attached by the attachment apparatus to the back of the work implement 16 in the form of an excavator bucket in the illustrated embodiment.

The depicted attachment apparatus includes a plurality of mounting brackets 32*a* that are attached to top horizontal member 23 of base frame 20 and an internal component 33 of work implement 16. The illustrated mounting bracket 32*a* is split into first and second parts 35, 37 that are adjustable relative to one another in a length direction from base frame 20 for attachment to work implements 16 of different sizes and/or configurations. First and second parts 35, 37 are adjusted to a proper length with respect to one another for secure attachment to a given work implement 16 and the first and second parts are secured to one another at the desired length by nuts and bolts or other suitable fasteners.

The attachment apparatus further includes two straps 30 with each attached to the bottom of the work implement 16 via a respective S hook and the lower horizontal member 23 of base frame 20 (the second strap is behind the strap 30 depicted in FIG. 6 and is not visible in FIG. 6).

Figure 7:
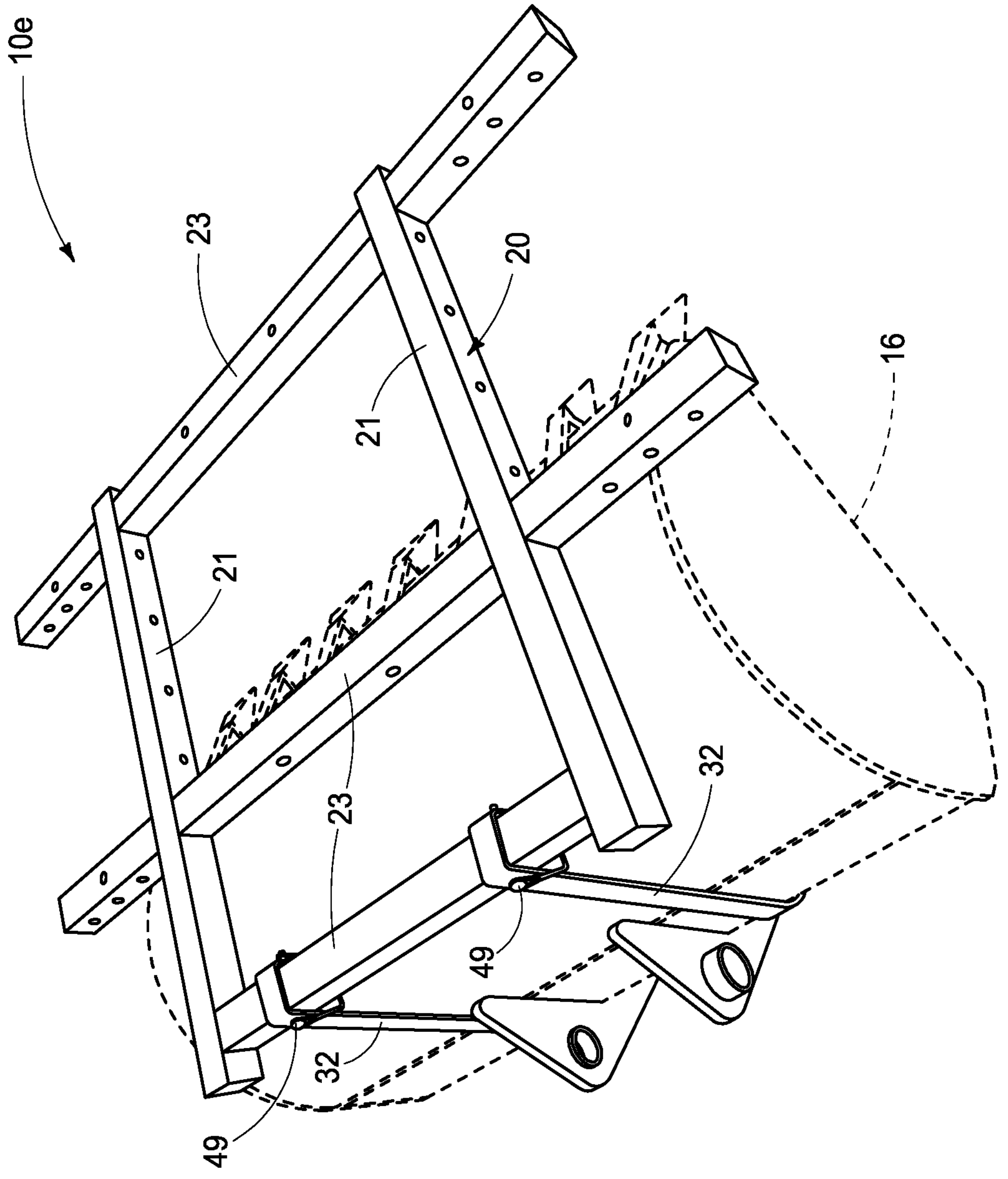
FIG. 7 is a perspective view of one embodiment of a powered machine accessory attached to a back of a bucket of an excavator or backhoe.

Referring to FIG. 7, another embodiment of a powered machine accessory 10*e* is attached to a back of a work implement 16 in the form of a bucket of an excavator or backhoe. The attachment apparatus of the embodiment of the accessory 10*e* shown in FIG. 7 includes two mounting brackets 32 that are attached to points of attachment at the top of the bucket and the top horizontal member 23 of base frame 20. Although not depicted in FIG. 7, the attachment apparatus of accessory 10*e* may additionally include two straps that attach to different points of attachment at the bottom of the bucket and the bottom horizonal member 23 of base frame 20 in a manner similar to the embodiment shown in FIG. 6.

Referring to FIG. 8, another embodiment of a powered machine accessory 10*f* is attached to a front of a work implement 16*a* in the form of a bucket of a tractor. The attachment apparatus of the depicted embodiment of FIG. 8 includes first and second straps 30 that are attached to left and right portions of the top horizontal member 23 of base frame 20 and pass behind the work implement 16*a* and are secured and tightened to the middle horizontal member 23 of base frame 20. T-posts 44 are also attached to the tops of vertical members 21 and operate as attachment implements in the depicted configuration to assist with attachment of the top portion of accessory 10*f* to the top of work implement 16*a*. The example accessory 10*f* additionally includes large L-posts 46 attached to the bottom attachment points 24 to support articles thereon.

Figure 9:
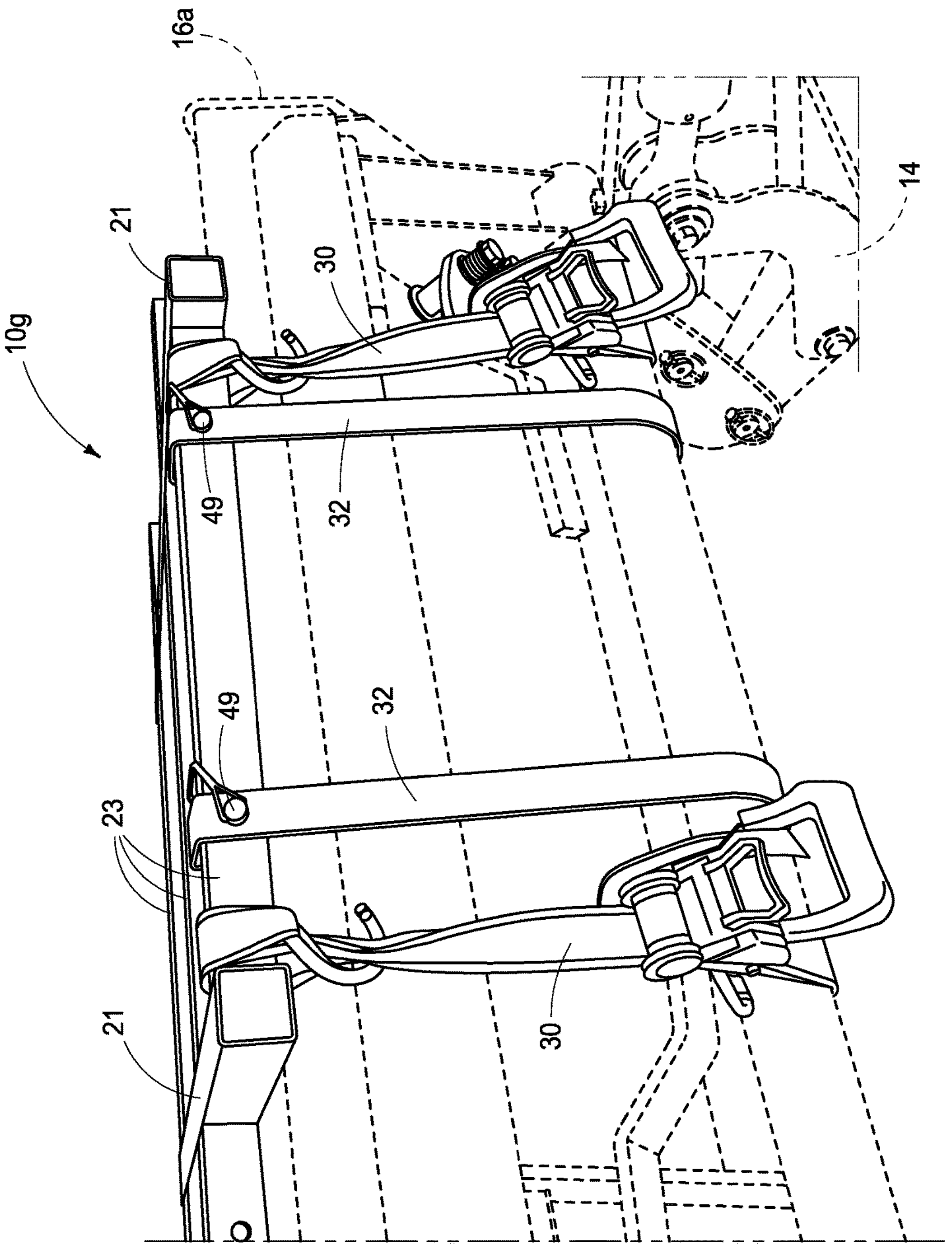
FIG. 9 is a perspective view of one embodiment of a powered machine accessory attached to a front of a bucket of a tractor.

Referring to FIG. 9, another embodiment of a powered machine accessory 10*g* is attached to a front of a work implement 16*a* in the form of a tractor bucket. The accessory 10*g* utilizes both a pair of straps 30 and mounting brackets 32 to attach the accessory 10*g* to different points of attachment at the top of the work implement 16. Additional straps may be used to attach the bottom horizontal member 23 of base frame 20 to a bucket bracket of the powered machine 12 (details of the additional straps and bracket are not shown in FIG. 9).

Figure 10:
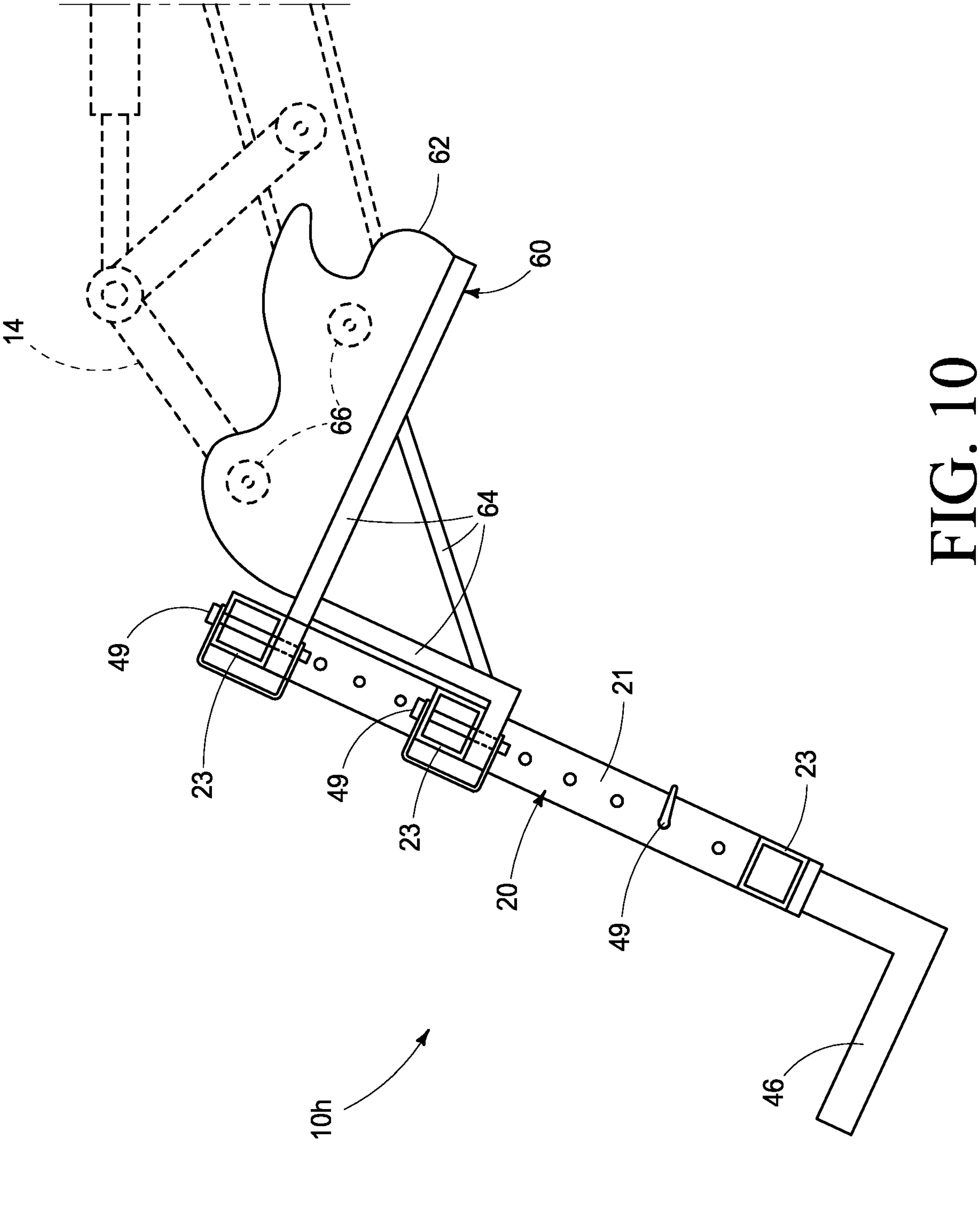
FIG. 10 is a side view of one embodiment of a powered machine accessory directly attached to an arm of a powered machine.

Referring to FIG. 10, another embodiment of powered machine accessory 10*h* is attached directly to points of attachment of the lift apparatus 14 of the powered machine 12 without attachment to a work implement thereof. The depicted example of powered machine accessory 10*h* includes an attachment apparatus in the form of a mount 60. The illustrated embodiment of the mount 60 includes a quick attach bucket ear 62 and a plurality of support members 64 of an associated bracket that are attached to the top and middle horizontal members 23 of base frame 20. Plural connection pins 66 provide points of attachment of the bucket ear 62 of accessory 10*h* directly to lift apparatus 14 in the form of a hydraulic arm in the illustrated embodiment.

Figure 11:
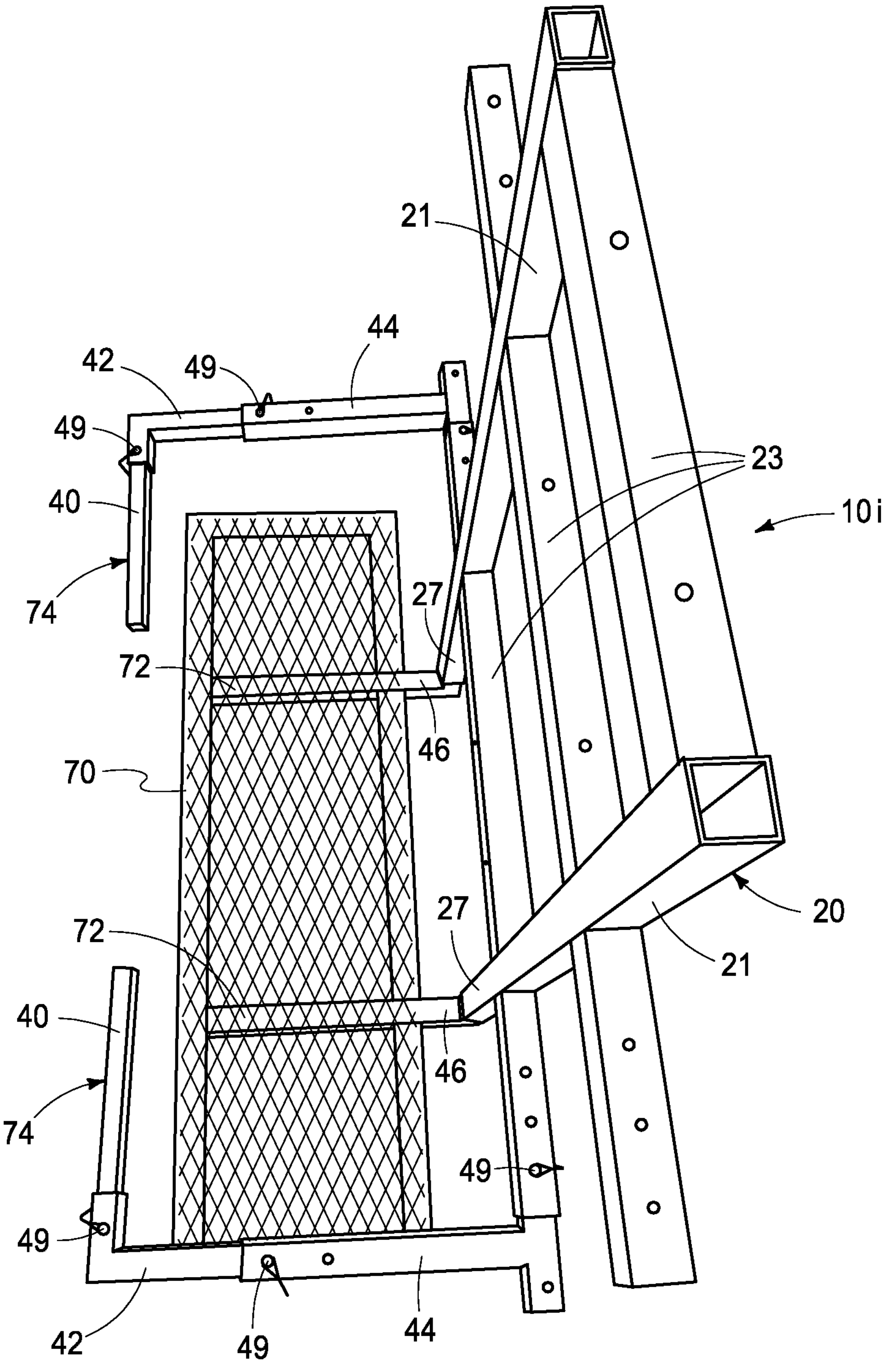
FIG. 11 is a perspective view of a powered machine accessory having a platform according to one embodiment.

Referring to FIG. 11, another embodiment of a powered machine accessory 10*i* is shown. The support apparatus of accessory 10*i* includes retaining implements including plural large L-posts 46 attached to lower attachment points 27 of base frame 20 and a platform 70 that provides a horizontal planar support for receiving and supporting articles, such as storage or garbage containers, or any other desired material to be moved by the powered machine. The embodiment of FIG. 11 also includes retaining implements including wrap-around retention arms 74 attached to the lower horizontal member 23 of the base frame 20 to operate as side and forward retainers to retain articles upon the platform 70 during movement of accessory 10*i* and articles thereon by the powered machine. Each of the retention arms 74 includes a T-post 44, small L-post 42 and extension 40. The accessory 10*i* also includes a plurality of sleeves 72 that are configured to slide over large L-shaped posts 46 that are attached to the base frame 20 of accessory 10*i*.

Figure 12:
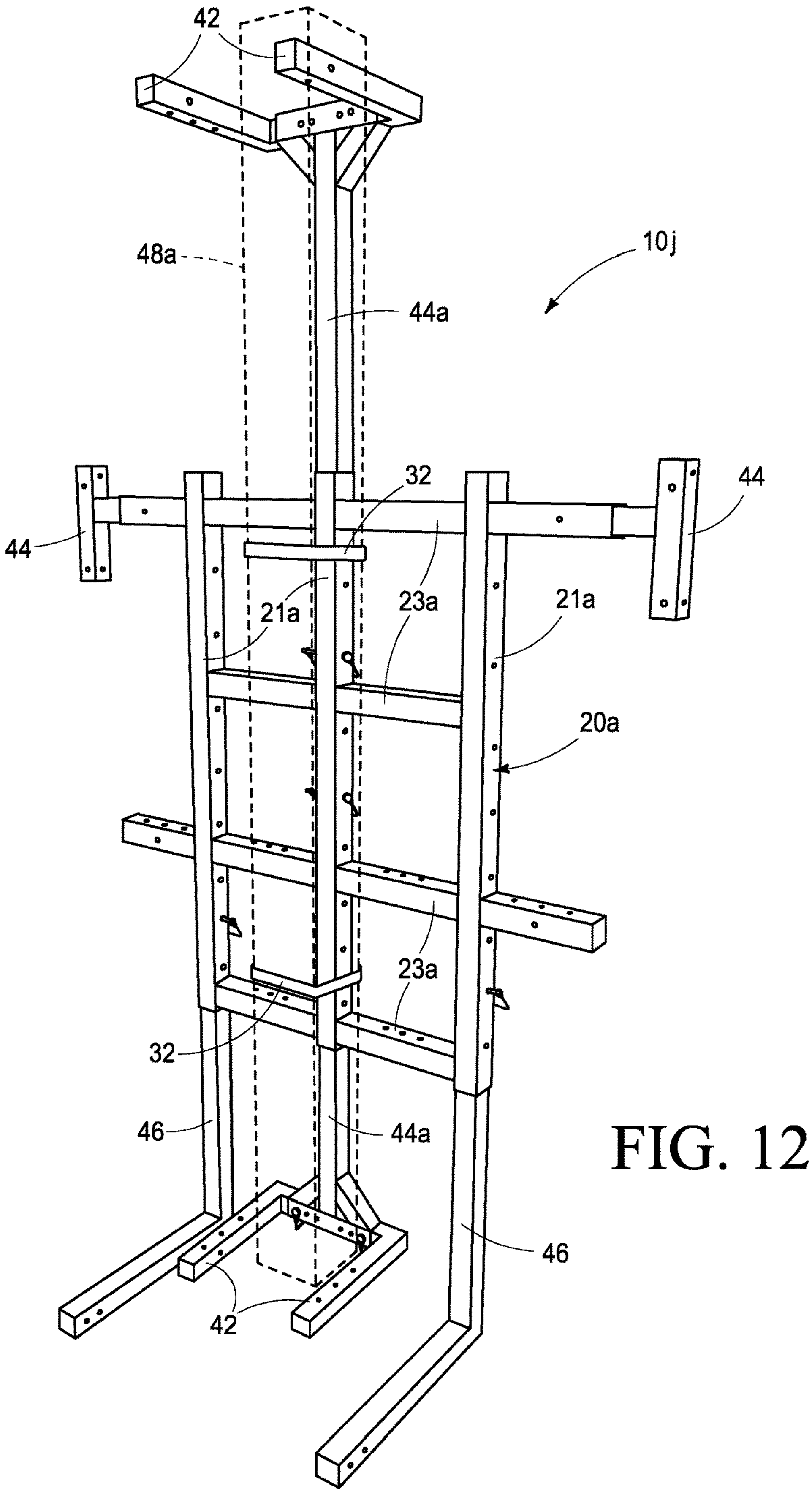
FIG. 12 is a perspective view of a powered machine accessory configured to support and retain a vertically-oriented article according to one embodiment.

Referring to FIG. 12, another embodiment of a powered machine accessory 10*j* is shown. A base frame 20*a* of the depicted accessory 10*j* has three vertical members 21*a*, four horizontal members 23*a* and two elongated and reinforced T-posts 44*a* that are adjustably coupled with top and bottom ends of the middle vertical member 21*a*. The accessory 10*j* is configured to hold, lift, place and set relatively long vertically-oriented articles 48*a*, such as beams, posts or poles, with respect to ground for example during construction of pole buildings or other applications. The support apparatus of accessory 10*j* includes two small L-posts 42 that are coupled with each T-post 44*a* and plural straps 32 that operate as retaining implements in the form of vertical retainers to support a vertically-oriented article 48*a* and secure the article 48*a* to base frame 20*a* during movement and/or setting of the vertically-oriented article 48*a*. The powered machine accessory 10*j* may be attached to powered lift apparatuses or implements thereof using attachment apparatuses and attachment implements shown and described herein with respect to the embodiments of FIGS. 1, 3, 4, and 6-10.

The different embodiments of the powered machine accessory shown and described herein are illustrative examples and other embodiments of the powered machine accessory may be used to support and retain other types of articles having different sizes, types and configurations and/or may be attached to different powered machines or work implements thereof.

Aspects of the present disclosure provide accessories for powered machines and work implements thereof that are configurable for use with various powered machines and articles or materials of various sizes, dimensions and types. The example powered machine accessories discussed herein may be used to support and move heavy or burdensome articles for various applications including movement of building materials during construction of buildings, movement of farm products, and other applications where materials are moved. The accessories disclosed herein increase the productivity and applications of use of powered machine assets while reducing the use of specifically-designed equipment for relatively narrow uses and/or manual labor.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended aspects appropriately interpreted in accordance with the doctrine of equivalents.

Further, aspects herein have been presented for guidance in construction and/or operation of illustrative embodiments of the disclosure. Applicant(s) hereof consider these described illustrative embodiments to also include, disclose and describe further inventive aspects in addition to those explicitly disclosed. For example, the additional inventive aspects may include less, more and/or alternative features than those described in the illustrative embodiments. In more specific examples, Applicants consider the disclosure to include, disclose and describe methods which include less, more and/or alternative steps than those methods explicitly disclosed as well as apparatus which includes less, more and/or alternative structure than the explicitly disclosed structure.

What is claimed is:

1. An accessory for a powered machine, the accessory comprising:

a base frame having plural vertical members and plural horizontal members and each of the plural vertical members and each of the plural horizontal members has a first end portion and a spaced apart second end portion, and each of the plural vertical members are interconnected to at least one of the plural horizontal members; and an attachment point at the first and the second end portions of one of the plural vertical members and an attachment point at the first and second end portions of one of the plural horizontal members; and plural attachment implements, that communicate between the base frame and a work implement of the powered machine to immovably secure the base frame to the work implement 16; and wherein at least one of the plurality of attachment implements is releasably interconnected with the base frame at one of the attachment points of the base frame; and a plurality of attachment members that are each releasably attachable to the attachment points of the base frame to reconfigure dimensions of the accessory to support/carry articles; and wherein at least one of the plurality of attachment members is releasably interconnected with the base frame at one of the attachment points of the base frame so as to extend outwardly from the respective first or second end portion, and the interconnected one of the plurality of attachment members is positionally secured to the base frame at the attachment point.

2. The accessory for a powered machine as claimed in claim 1 and wherein attachment points are located at the first and second end portions of at least two horizontal members.

3. The accessory for a powered machine as claimed in claim 1 and wherein the attachment points are hollow and are configured to slidably axially receive the attachment members therein.

4. The accessory for a powered machine as claimed in claim 1 and wherein the plurality of attachment members are hollow and are configured to slidably axially receive the attachment poin therein.

5. The accessory for a powered machine as claimed in claim 1 and wherein one of the plurality of attachment members may be rotated axially relative to the attachment point to provide different angular relationships of the one attachment member relative to the base frame when the one attachment member is interconnected to the base frame at the attachment point.

6. The accessory for a powered machine as claimed in claim 1 and wherein at least one of the attachment implements is a flexible strap.

7. The accessory for a powered machine as claimed in claim 1 and wherein the base frame is releasably immovably secured to a convex curvilinear portion of the work implement.

8. The accessory for a powered machine as claimed in claim 7 and wherein the convex curvilinear portion of the work implement is opposite a cavity defined by the work implement.

9. The accessory for a powered machine as claimed in claim 1 and wherein the base frame is releasably immovably secured to a concave portion of the work implement.

10. The accessory for a powered machine as claimed in claim 1 and wherein the plural vertical members and the plural horizontal members of the base frame are tubular.

11. The accessory for a powered machine as claimed in claim 1 and further comprising:

plural spacedly arrayed holes defined in the base frame; and plural spacedly arrayed holes defined in each of the plurality of attachment members; and a pin-like structure that extends simultaneously through the holes defined in the base frame and the holes defined in each of the plurality of attachment members to positionally secure the respective attachment member to the attachment point of the base frame.

12. The accessory for a powered machine as claimed in claim 1 and wherein the plurality of attachment members, when fixedly interconnected with the base frame, reconfigure the accessory to support articles having dimensions that extend beyond dimensions of the base frame.

13. The accessory for a powered machine as claimed in claim 1 and wherein the plurality of attachment members, when fixedly interconnected with the base frame, reconfigure the accessory to have dimensions that extend beyond dimensions of the work implement.

14. The accessory for a powered machine as claimed in claim 1 and wherein the plurality of attachment members have a plurality of different structural configurations.

15. The accessory for a powered machine as claimed in claim 1 and further comprising:

a platform that is releasably fixedly interconnected with the base frame; and the platform has an attachment member that releasably engages with an attachment point of the base frame; and a connection pin that extends axially through aligned holes defined in the base frame and defined in the attachment member of the platform positionally secure the platform to the base frame.

16. The accessory for a powered machine as claimed in claim 1 and wherein the accessory is configured to carry/support elongated articles that are oriented generally parallel to the plural vertical members of the base frame; and a length dimension of the carried/supported elongated article exceeds a vertical dimension of the work implement, and also exceeds a vertical dimension of the base frame; and the carried/supported elongated article is supported on the base frame by an attachment member that is interconnected to one of the attachment points of the base frame and the interconnected attachment member has a length dimension that extends beyond a periphery of the work implement.

17. The accessory for a powered machine as claimed in claim 1 and further comprising:

a winch support coupled with the base frame and the winch support is configured to operably retain a winch thereon.

18. The accessory for a powered machine as claimed in claim 1 and wherein the plural attachment implements releasably immovably secure the base frame to a bucket of an excavator-type powered machine.

19. The accessory for a powered machine as claimed in claim 1 and wherein the plural attachment implements releasably immovably secure the base frame to a back-side of an excavator bucket.

20. The accessory for a powered machine as claimed in claim 1 and wherein the plural attachment implements releasably immovably secure the base frame to a bucket of a tractor-type powered machine.

21. The accessory for a powered machine as claimed in claim 1 and wherein the plurality of attachment members, when interconnected to the base frame at the attachment points, contact a carried/supported article at plural spaced apart locations about the carried/supported article.

22. An accessory for a work implement of a powered machine, the accessory comprising:

a base frame having a first vertical member, a second vertical member spaced apart from the first vertical member, a first horizontal member, a second horizontal member spaced apart from the first horizontal member, and a third horizontal member spaced apart from the second horizontal member, and each of the vertical members and each of the horizontal members has a first end portion and a spaced apart second end portion, and each of the vertical members is interconnected with each of the horizontal members so that the base frame is rigid and generally rectilinear in peripheral configuration;

an attachment point at each of the first and the second end portions of at least one vertical member and an attachment point at each of the first and second end portions of at least one horizontal member;

plural attachment implements that communicate between the base frame and the work implement of the powered machine (to releasably immovably secure the base frame to the work implement, and wherein at least one of the plural attachment implements is a flexible strap;

a plurality of attachment members that are each releasably attachable to the attachment points of the first and second vertical members and the first, second and third horizontal members of the base frame, and the plurality of attachment members, when releasably attached to the first and second vertical members and the first, second and third horizontal members of the base frame alter a width dimension of the accessory, or alter a height dimension of the accessory, or alter a thickness dimension of the accessory so that the accessory is configurable to movably support an article carried by/supported by the accessory; and wherein at least one of the plurality of attachment members is releasably interconnected with the base frame at one of the attachment points of the base frame so as to extend outwardly from the respective first or second end portion, and the interconnected one of the plurality of attachment members is positionally secured to the base frame at the attachment point with a connection pin or similar structure that extends through axially aligned holes defined in the base frame and defined in the attachment member.

23. The accessory for a powered machine as claimed in claim 22 and wherein the plural attachment implements releasably immovably secure the base frame to a bucket of an excavator-type powered machine.

24. The accessory for a powered machine as claimed in claim 22 and wherein the plural attachment implements releasably immovably secure the base frame to a curvilinear back-side of an excavator bucket.

25. The accessory for a powered machine as claimed in claim 22 and wherein the plural attachment implements releasably immovably secure the base frame to a bucket of a tractor-type powered machine.

26. The accessory for a powered machine as claimed in claim 1 and wherein the reconfigured dimensions are a height dimension or a width dimension or a depth dimension.

* * * * *